United States Patent
Rudak et al.

(10) Patent No.: US 6,317,223 B1
(45) Date of Patent: Nov. 13, 2001

(54) IMAGE PROCESSING SYSTEM FOR REDUCING VERTICALLY DISPOSED PATTERNS ON IMAGES PRODUCED BY SCANNING

(75) Inventors: Peter Rudak, Hilton; Yongchun Lee; James M. Stefanko, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/211,600

(22) Filed: Dec. 14, 1998

(51) Int. Cl.$^7$ .............................. G06T 5/50; H04N 1/409
(52) U.S. Cl. ........................................... 358/275; 358/463
(58) Field of Search ................................... 382/275, 270, 382/272, 273, 274, 192, 195, 237; 358/463, 466, 465

(56) References Cited

U.S. PATENT DOCUMENTS

| | | | |
|---|---|---|---|
| 4,649,436 | * | 3/1987 | Nakagawa et al. .................. 358/463 |
| 5,214,470 | * | 5/1993 | Denber ................................. 382/275 |
| 5,223,951 | * | 6/1993 | Umakoshi ............................ 358/463 |
| 5,436,979 | * | 7/1995 | Gray et al. ........................... 382/254 |
| 5,583,659 | | 12/1996 | Lee et al. ............................. 382/270 |
| 5,974,194 | * | 10/1999 | Hirani et al. ........................ 382/254 |
| 6,035,072 | * | 3/2000 | Read .................................... 382/275 |
| 6,125,213 | * | 9/2000 | Morimoto ............................ 382/275 |

FOREIGN PATENT DOCUMENTS

| | | | | |
|---|---|---|---|---|
| 1014677 A2 | * | 6/2000 | (EP) | ............................... H04N/1/00 |
| 1014691 A2 | * | 6/2000 | (EP) | ............................. H04N/1/409 |

\* cited by examiner

*Primary Examiner*—Scott Rogers (57) ABSTRACT

A digital image processing system applies an edge-based adaptive thresholding technique with different contrast parameters to convert an image into first and second binary images. In the digital processing system of the invention, the first and second binary images are compared and a map of the difference between the first and second binary images is generated. A vertical profile of this map is projected and local peaks in the vertical profile which correspond to a vertical pattern or artifact in the map is detected. Pixels in the first binary image are reversed based on the vertical pattern or artifact in the map. This system is effective in reducing vertical artifacts produced by scanners.

11 Claims, 13 Drawing Sheets

IMAGE PROCESSING SYSTEM FOR REDUCING VERTICALLY DISPOSED PATTERNS ON IMAGES PRODUCED BY SCANNING

CROSS REFERENCE TO RELATED APPLICATIONS

The present application is related to U.S. patent application Ser. No. 08/739,076, filed Oct. 25, 1996, by Yongchun Lee titled "A Look-Up-Table (LUT) Technique For Conversion Of A Bitmap Into Polygonal Representation" and U.S. patent application Ser. No. 09/211,125 by Yongchun Lee, Peter Rudak and Daniel T. Jaramillo titled "An Artifact Removal Technique For Skew Corrected Images".

FIELD OF THE INVENTION

The present invention relates to an image processing system which removes vertical artifacts such as lines on images produced by scanning an original document, without loss of image information.

BACKGROUND OF THE INVENTION

Unexpected vertical black patterns or artifacts such as lines, dots, dashes, etc., have been a common image artifact in binary document images produced by production paper scanners. The vertical black patterns are not part of the original document image, however, the patterns are the result of pieces of dust or dirt blocking light between an illumination light source and the paper documents being scanned. For example, pieces of dust or dirt which come to rest on transparent image guides in an illumination path of the scanner will result in shaded lines upon the document moving through the scanner. When the document is electronically captured by a CCD device, the shaded lines will appear in the digital document image. The shaded vertical lines within a grey scale image will be indistinguishably treated as part of image content. After an adaptive thresholding is applied to the grey scale image, the shaded lines will show up as black lines in the binary image.

One current solution to this problem is to routinely remove the dust or dirt from the illumination path by cleaning the transparent image guides. However, this solution requires interruption of the scanner operation which is undesirable in a production scanner.

SUMMARY OF THE INVENTION

An object of the present invention is to provide for a digital image processing method which identifies vertically disposed patterns or artifacts caused by dirty image guides in scanners and then subtracts the vertically disposed patterns before creating the final image of the scanned document. The vertically disposed patterns can be in the form of lines, dashes, dots, etc.

The present invention provides for a digital image processing method which includes the steps of (1) applying an edge-based adaptive thresholding method twice with different contrast parameter settings to convert an image such as a gray scale image into two binary images; (2) generating a map of the difference from the two binary images; (3) projecting the vertical profile of the map; (4) detecting the local peaks, (i.e. vertical lines, dashes, dots, etc.) from the vertical projection profile; (5) locating the regions of the vertical lines, dashes, dots, etc. in the map based on the detected local peaks; and (6) reversing pixels from the binary images based on the vertical lines, dashes, dots, etc. of the map.

The method of the present invention includes: capturing a document image by a CCD array in raster scan fashion; applying an edge-based adaptive thresholding technique [1] with a normal contrast setting to extract every detail of image information and storing the resulting binary image, named as B1; applying the same edge-based adaptive thresholding technique with a low contrast setting which only extracts high contrast details of the image, named as B2; labelling the difference of B1 and B2, and storing the map of the difference, named as D; projecting the vertical profile of the map (D); locating the vertically disposed patterns by detecting the local peaks in the vertical projection profile, resulting in a map of the vertically disposed patterns, named as V; reading the binary image (B1) and the map of the vertically disposed patterns (V); and reversing pixels in the B1 image at the corresponding black pixel locations in the V map.

The present invention provides for an image processing method which comprises the steps of: converting an image into first and second binary images; comparing the first and second binary images and generating a map indicative of a difference between the first and second binary images; projecting a vertical profile of the map and detecting peaks in the vertical profile; locating regions of vertically disposed patterns in the map based on the detected peaks; and reversing pixels from the first binary image based on the vertically disposed patterns in the map.

The present invention further relates to an image processing method which comprises the steps of: capturing an image; extracting image information from the image and storing a resulting image as a first binary image; extracting high contrast details from the image and storing a resulting image as a second binary image; comparing the first and second binary images and generating a bitmap indicative of a difference between the first and second binary images; projecting a vertical profile of the bitmap; locating regions of vertically disposed patterns in the bitmap by detecting local peaks in the vertical profile so as to provide for a map of vertically disposed patterns; and reversing pixels from the first binary image based on the vertically disposed patterns of the map.

The present invention further relates to an image processing method which comprises the steps of: converting an image into first and second binary images; generating a map indicative of a difference between the first and second binary images; and reversing pixels from the first binary image based on vertically disposed patterns in said map.

The present invention further relates to an image capture assembly that comprises an image capture section which captures an image; a conversion section which converts the captured image into digital image information indicative of the captured image; and a processing section which receives the digital information and converts the captured image into first and second binary images. The processing section compares the first and second binary images to generate a map indicative of a difference between the first and second binary images and reverses pixels from the first binary image based on vertically disposed patterns in the map.

This invention takes advantage of a general trend that any real-world document would not contain significant "page length" vertical lines of low contrast. Typically, only variable date (handprint, typewriter etc.) would be of low contrast, while lines and graphics would be part of a form (high contrast).

DETAILED DESCRIPTION OF THE INVENTION

Figure 1A:
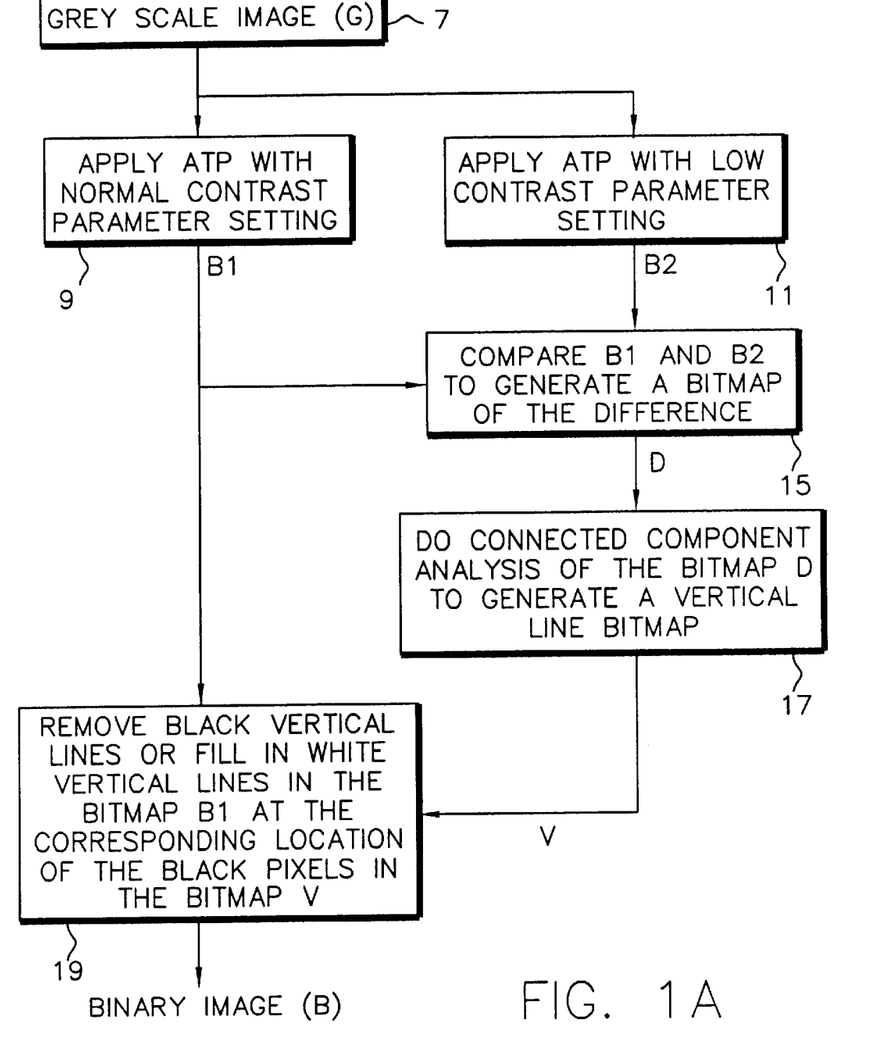
FIG. 1A is a flowchart of image processing steps for converting a grey scale image into a binary image with minimal image artifacts.

Referring now to the drawings, wherein like reference numerals represent identical or corresponding parts throughout the figures, a block diagram of an image processing method that performs an image thresholding with minimal vertical line artifacts is shown in FIG. 1A. The method and assembly of the present invention will be described with respect to vertical lines, however, it is recognized that the present invention is not limited to the removal of lines. The present invention is applicable to removing or reducing vertically disposed visual patterns or artifacts such as lines, dashes, dots, marks and any combination thereof. In the image processing method of the present invention, an image such as digital gray scale image data (G) is received as input (step 7), and the method operates as follows: (1) An edge-based image thresholding is first applied (step 9) to convert the grey scale image (G) into a binary image (B1) with normal contrast parameter setting which extracts full details of image information; (2) The edge-based image thresholding is applied again (step 11) to convert the grey scale image (G) into another binary image (B2) with low contrast parameter setting which only extracts dark high-contrast objects; (3) The two binary images, (B1) and (B2), are compared pixel-by-pixel (step 15), identifying a pixel as a "black" pixel if there is a difference and a "white" pixel if there is no difference, to generate a map of the difference, named as (D), between the two binary images (B1) and (B2); (4) The vertical visual artifacts such as vertical lines in the map (D) are located (step 17) by doing a vertical projection profile analysis which results in a map of vertical lines, named (V); and (5) The final thresholded image (B) is obtained (step 19) by removing corresponding black pixels and by filling in corresponding white pixels in the thresholded image B1 in the location of the black pixels in the bitmap (V).

Figure 1B:
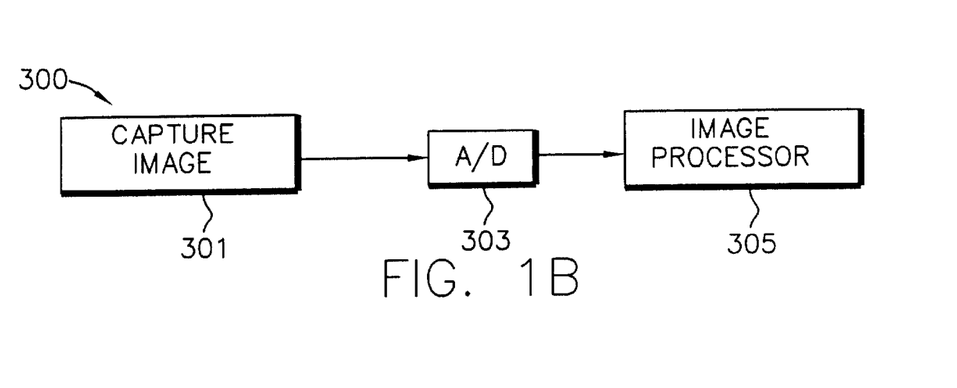
FIG. 1B is a schematic illustration of an image capture assembly which incorporates the system of the present invention.

FIG. 1B shows a schematic illustration of an image capture assembly 300 which processes captured images in accordance with the described features of the present invention. Image capture assembly 300 can be a scanner which includes an image capture section 301 in the form of, for example, a charge coupled device that captures an image, and a conversion section 303 in the form of, for example, an A/D converter which converts the captured image into digital information indicative of the captured image. The digital information is sent to a processing section 305 which processes the digital image information as described with reference to FIG. 1A, and as will be further described with reference to FIGS. 2A, 3A, 4A and 5A.

Edge-Based Adaptive Image Thresholding

Figure 2A:
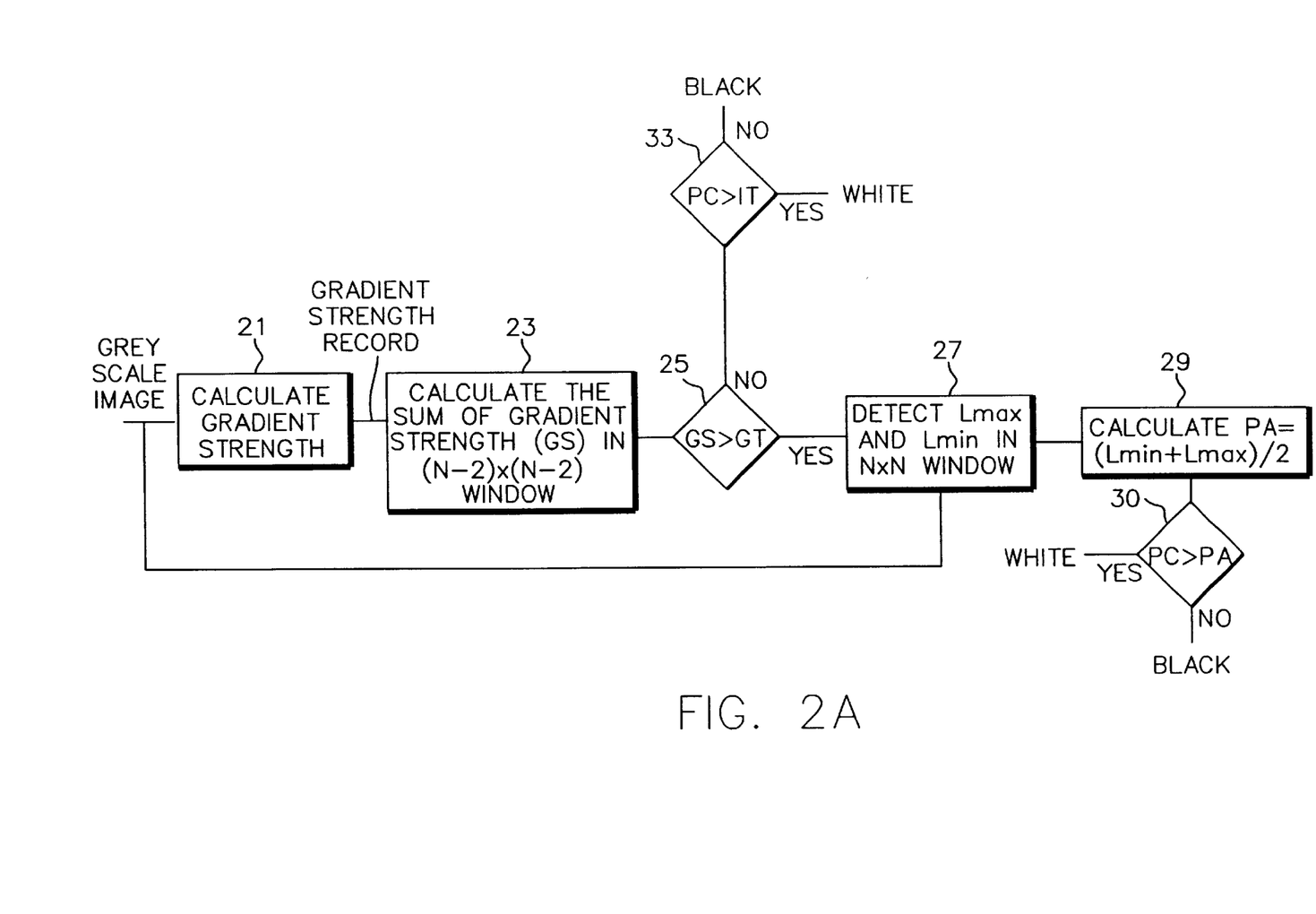
FIG. 2A is a flowchart outlining the steps of an edge-based adaptive thresholding (ATP)
Figure 2B:
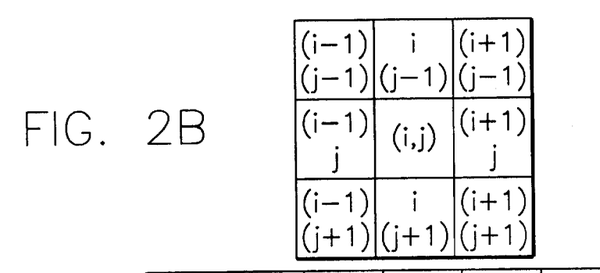
FIG. 2B depicts a 3-by-3 matrix of pixel location definition used in determining gradient strength for a current pixel(i,j)

FIG. 2A is block diagram of an image processing system that performs the edge-based adaptive thresholding. The thresholding method receives as input the digital image from a scanner and operator specified input parameters IT (intensity threshold) and GT (gradient threshold) and includes the following steps:

First, Sobel gradient operator is applied to the image intensity record to produce a gradient strength record (step 21). The Sobel operator works on a 3-by-3 window of pixels, as shown in FIG. 2B, to compute the horizontal and vertical intensity gradients, GX(i,j) and GY(i,j) at pixel position (i,j). The gradient strength GS(i,j) at pixel position (i,j) is the absolute sum of the horizontal and vertical intensity gradients, GX(i,j) and GY(i,j) respectively. The GX(i,j) and GY(i,j) are defined as follows:

$GX(i,j)=L(i+1,j-1)+2L(i+1,j)+L(i+1,j+1)-L(i-1,j-1)-2L(i-1,j)-L(i-1,j+1)$;

$GY(i,j)=L(i-1,j+1)+2L(i,j+1)+L(i+1,j+1)-L(i-1,j-1)-2L(i,j-1)-L(i+1,j=1)$;

$GS(i,j)=|GX(i,j)|+|GY(i,j)|$, where

GS(i,j)=Gradient strength record at pixel position (i,j) after gradient operation.

Figure 2C:
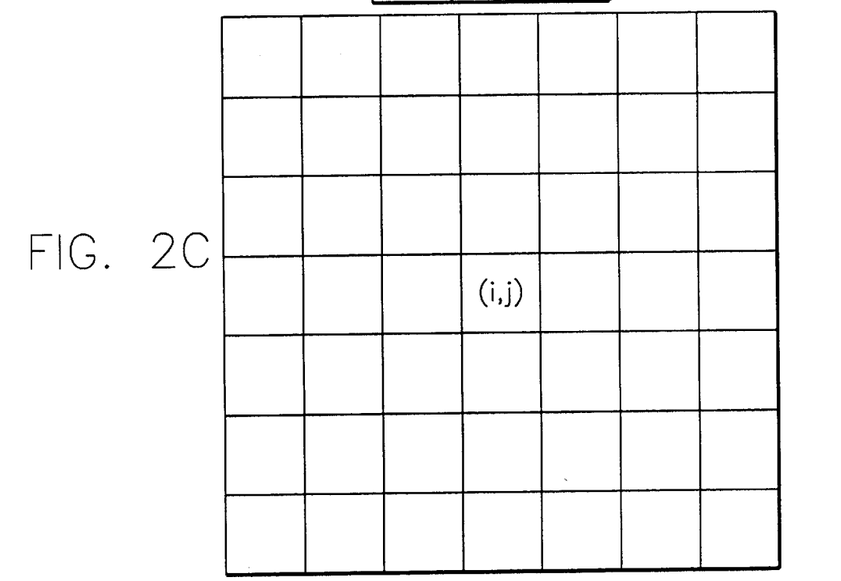
FIG. 2C depicts a graphical representation of an N-by-N neighborhood of pixels centered about a current pixel(i,j) in an image intensity record.
Figure 2D:
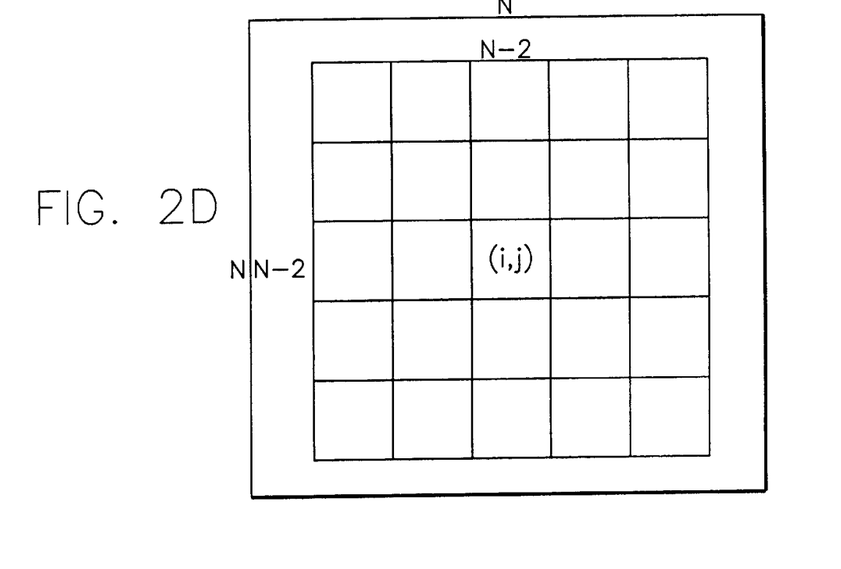
FIG. 2D depicts a graphical representation of an (N−2)-by-(N−2) neighborhood of pixels centered about pixel position(i,j) in an image intensity gradient record.

L(i,j)=Image intensity at pixel position (i,j);

Second, the minimal intensity—Lmin(i,j) and maximal intensity—Lmax(i,j) in a N-by-N window are measured (step 27) from the image intensity record as shown in FIG. 2C and the sum of gradient strength GS (i,j) in a (N−2)-by-(N−2) window, as shown in FIG. 2D, is calculated from the gradient strength (step 23 of FIG. 2A). The sum of gradient GS (i,j) is defined as an area gradient. Next, the three feature values GS (i,j), Lmin (i,j), Lmax (i,j) are used for classifying the pixel at (i,j) into black or white in the image intensity record. The final process is the extraction of black pixels (objects). The first step of extraction is the detection of pixels near an edge. A pixel at (i,j) near an edge is confirmed whenever the area gradient is high and larger than a predetermined value—a gradient threshold (GT) (step 25). After a pixel near an edge is found the pixel (the center pixel of the local window) is classified as black (object) when its intensity is smaller than the average of Lmin(i,j) and Lmax (i,j) (steps 29 and 30). That is, it is in the darker side of an edge. On the other hand, if its intensity is larger than the average (PA) of Lmin(i,j) and Lmax(i,j), it is classified into white (background) (step 30). In case of an area gradient smaller than the gradient threshold (GT) (step 25), such as a N×N window moving in a flat region, the classification is then made by a simple thresholding. That is comparing the gray value of the pixel with another predetermined intensity threshold value (IT). If the gray value of a pixel is smaller than IT, the pixel is classified as black; otherwise it is treated as white background (step 33).

The image quality after thresholding by the technique is controlled by the user's selection of the two threshold (GT and IT) settings. The GT is set for classifying pixels in the vicinity of edges and the IT is then set for classifying pixels in uniform regions. A low GT setting tends to extract edge pixels of light objects and a low IT setting inclines to classify pixels of a gray uniform region into white background. On the other hand, with a very high GT setting, the algorithm acts just like a fixed thresholding with threshold setting at IT. Since under this situation GT is always larger than the area gradient, the pixel classification of the image as shown in FIG. 2A is solely determined by comparing IT with the intensity at the pixel of interest. The technique can also produce an outline image by simply setting the IT to zero in which all pixels classify as white except the edge pixels where area gradients are larger than GT.

Figure 2E:
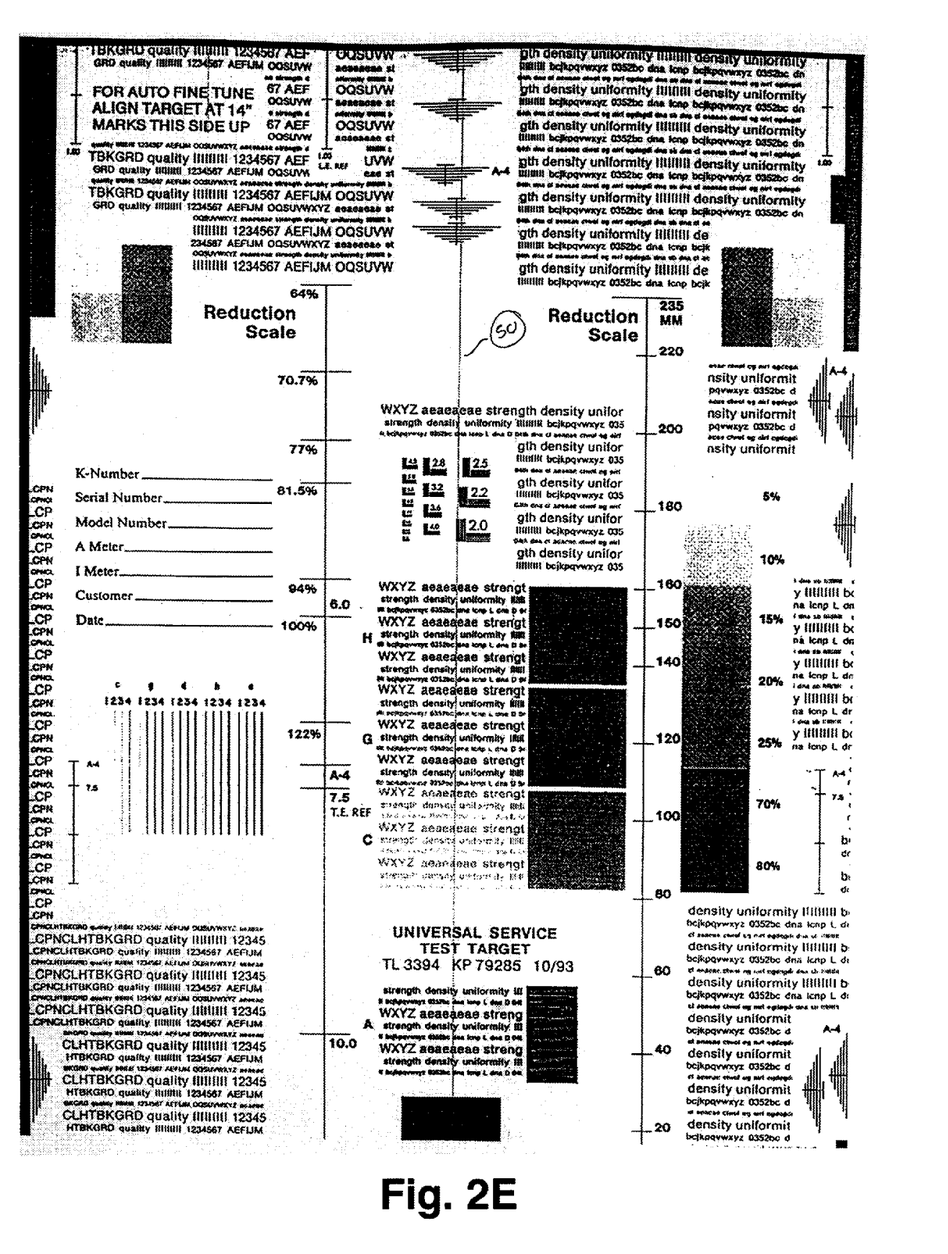
FIG. 2E is an example of a grey scale image captured by a production scanner.
Figure 2F:
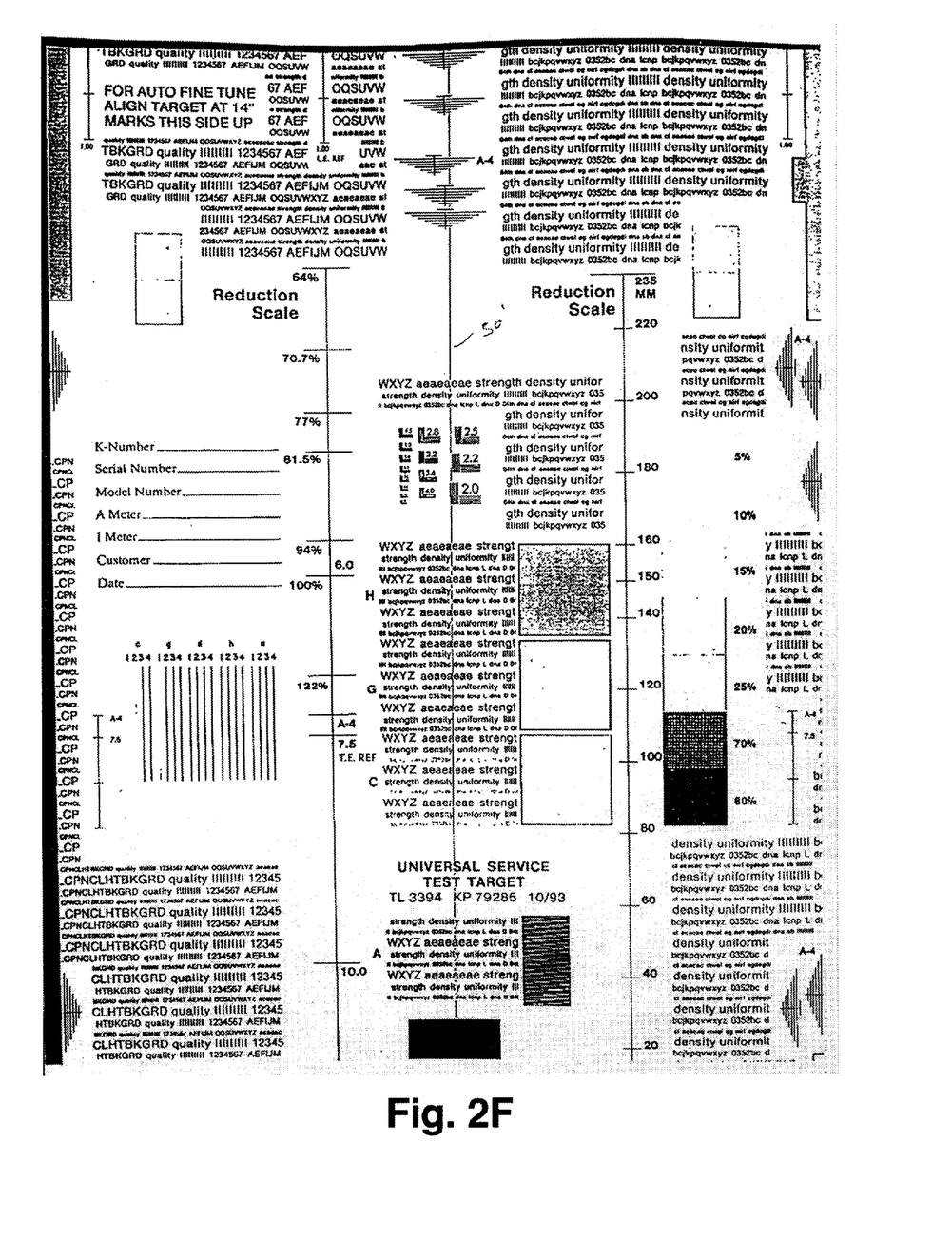
FIG. 2F is an example of a thresholded image (B1) with normal contrast parameter setting.
Figure 2G:
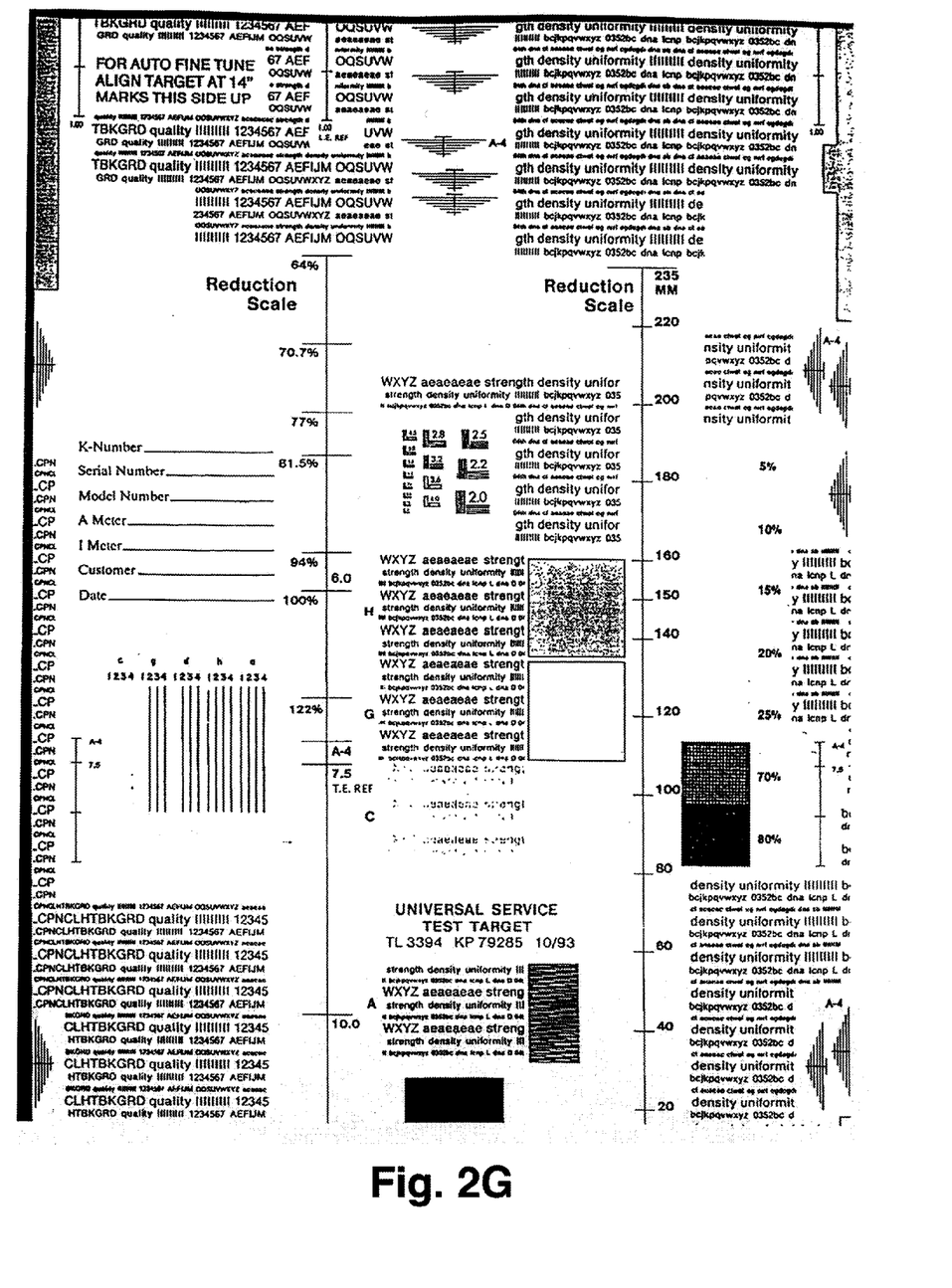
FIG. 2G is an example of a thresholded image (B2) with low contrast parameter setting.

An example of a captured grey scale document image using a production scanner is shown in FIG. 2E. A few light vertical line image artifacts 50 are observed. FIG. 2F is the thresholded image obtained by applying the edge-based thresholding technique with a normal contrast setting to the grey scale image in FIG. 2E. Since the image thresholding with a normal contrast setting attempts to extract every details of image information in the grey scale image, it also turns the unwanted, light vertical lines into vertical black lines 50'. In the case of a low contrast setting, the light contrast objects such as the light vertical lines, light characters and any light objects are ignored in the thresholding process and they are not exhibited in the thresholded image as shown in FIG. 2G.

The Generation of a Map of Image Difference

Figure 3A:
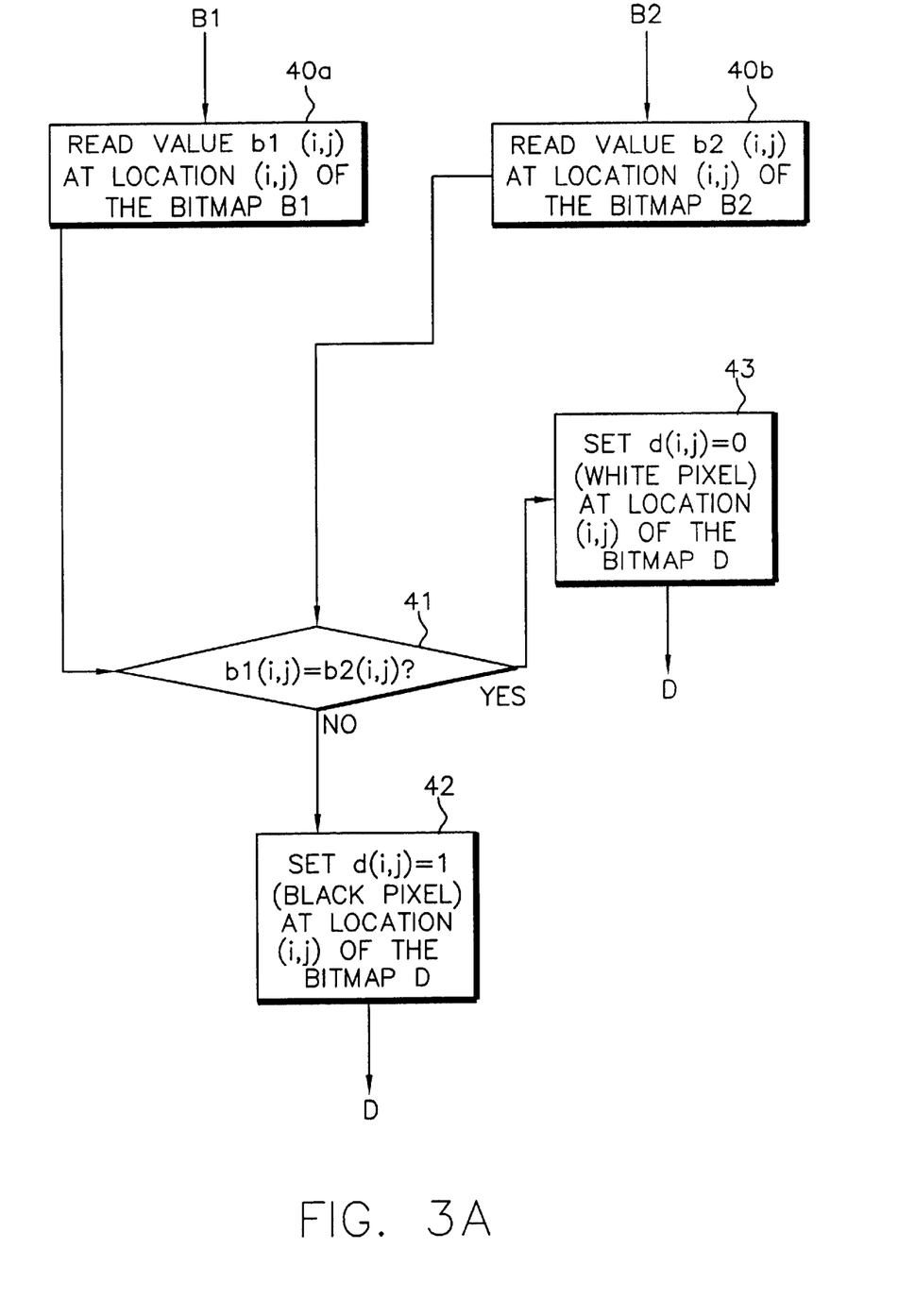
FIG. 3A is a flowchart of generating a map of the difference between two binary images.
Figure 3B:
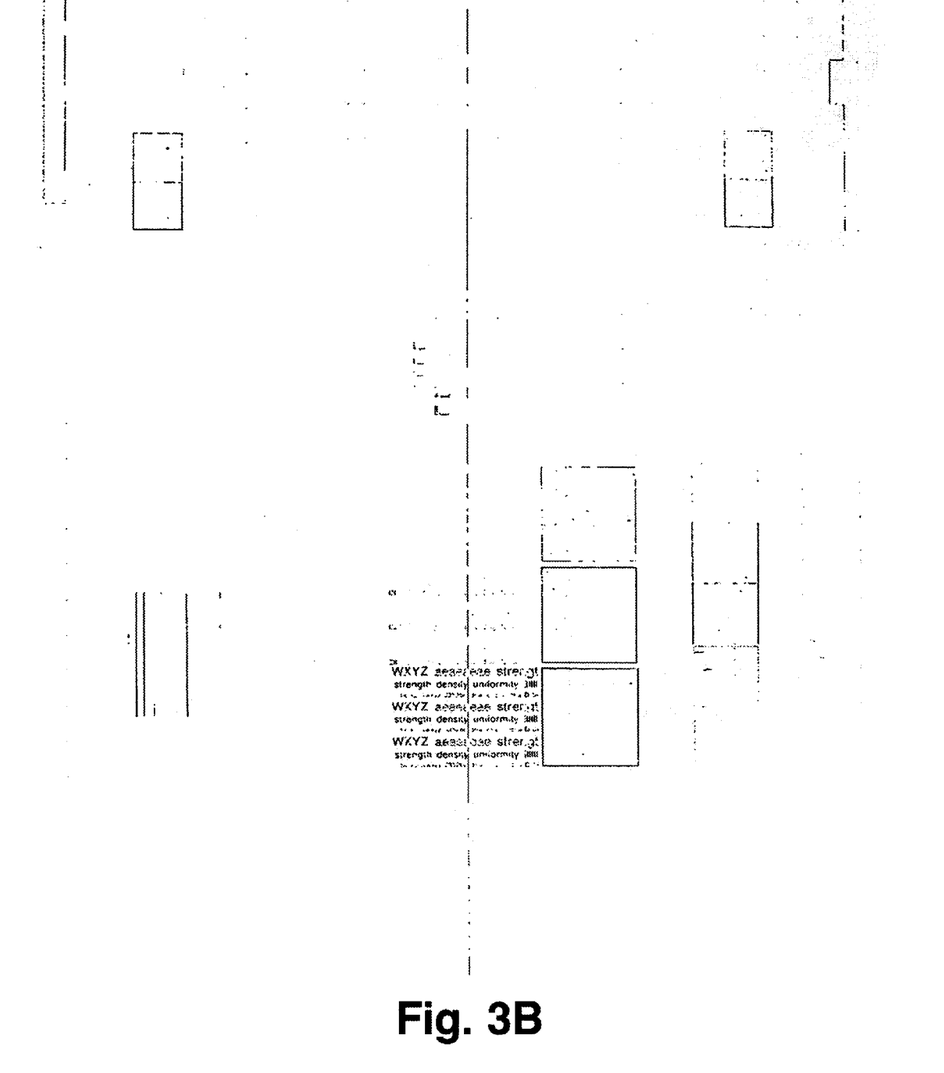
FIG. 3B is an example of a map of the difference between the binary images B1 and B2 in FIG. 2E and FIG. 2F, respectively.

FIG. 3A is a block diagram of generating a map of the image difference between the two thresholded images B1 and B2 of FIG. 1. As shown in FIG. 3A, a bitmap value B1 (i,j) which is either 1 (black) or 1 (white) at location (i,j) of the image B1 is read (step 40a), and a bitmap value B2 (i,j) at the corresponding location (i,j) of the image B2 is also read (step 40b). If the value B1 (i,j) is different from the value B2 (i,j) (step 41), that is one is black and the other is white, then the value d(i,j) at location (i,j) of a new map D is marked as 1 (black pixel)(step 42), otherwise, it is marked as O (white pixel)(step 43). The process above is applied through every pixel location (i,j) in the images B1 and B2, and produces an image map D which indicates the difference of B1 and B2. The process indicates that only the low contrast or light objects are extracted and exhibited in the map of the difference. FIG. 3B is an example of a generated map which is the difference of the two thresholded images in FIG. 2F and 2G.

The Generation of a Map of Vertical Lines

Figure 4A:
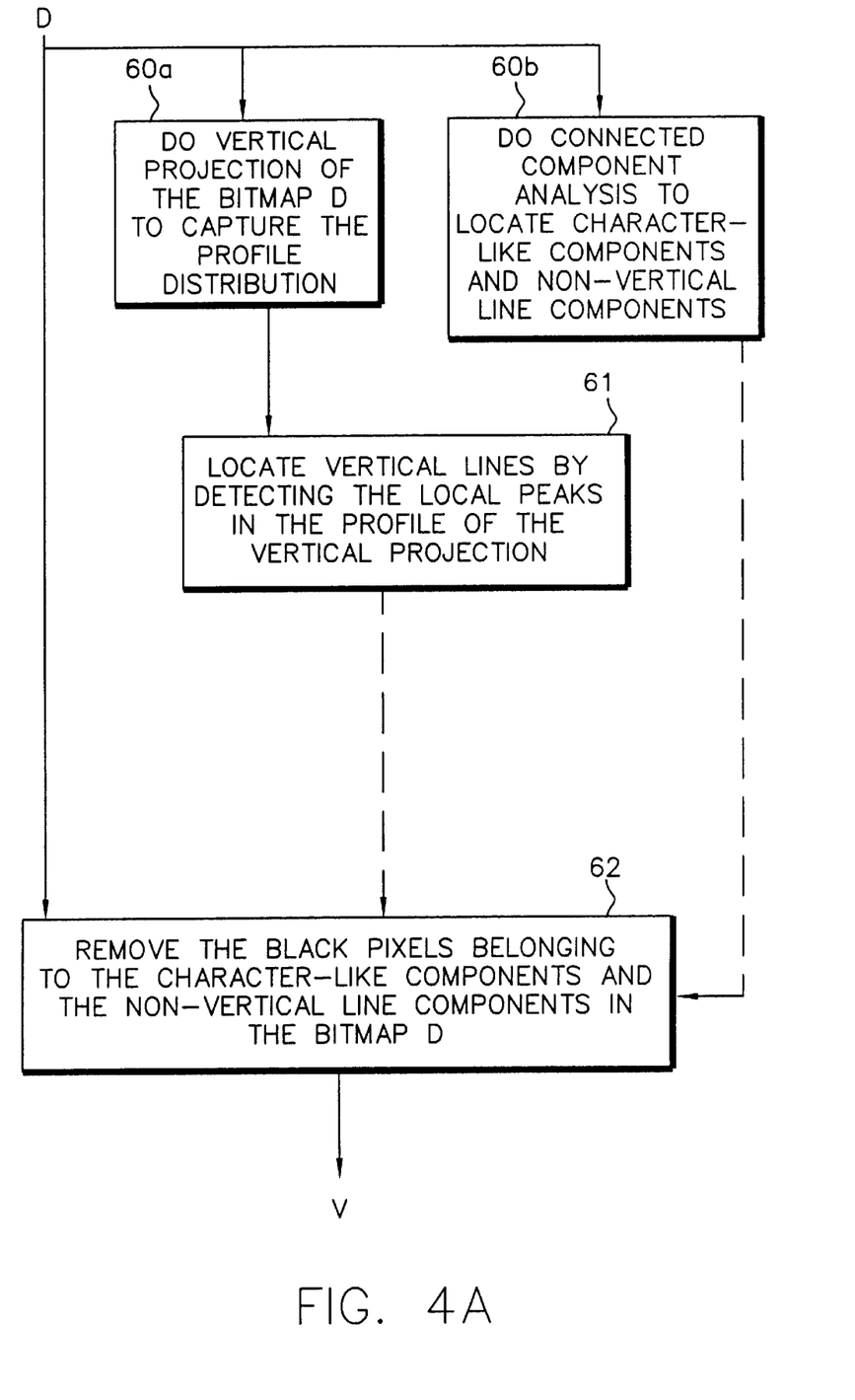
FIG. 4A is a flowchart of analyzing the map of the difference and generating a vertical line map.
Figure 4B:
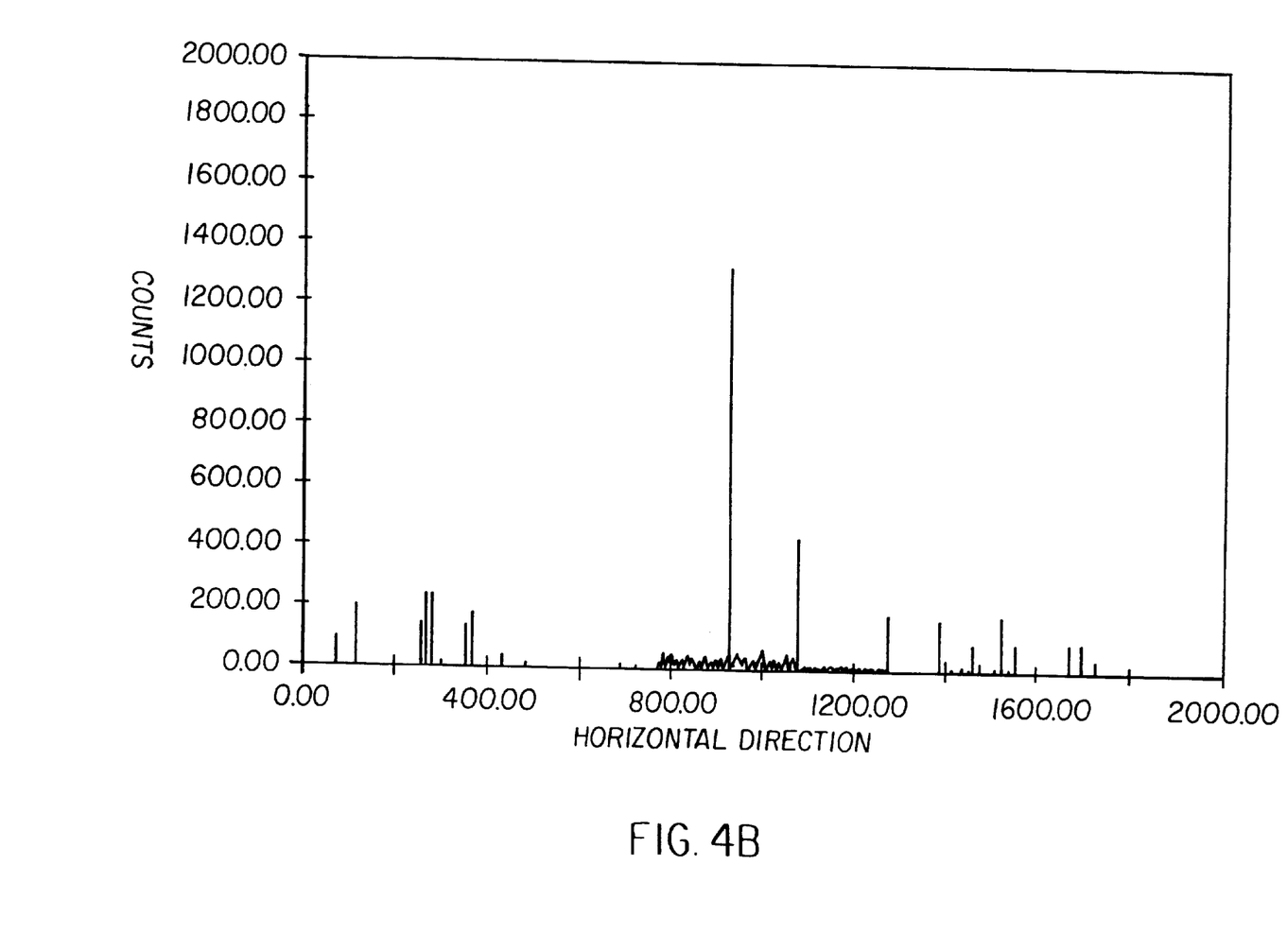
FIG. 4B is an example of the vertical projection profile obtained from the map of FIG. 3B.

FIG. 4A is a block diagram of generating a map of vertical lines. The generation of vertical lines is made by projecting a vertical profile of the map D (step 60a), and by doing standard connected component analysis (2) to locate character-like components and non-vertical line components (step 60b). The vertical, projection, profile is the frequency distribution of black pixels in a one dimensional plane. It allows one to easily locate the vertical lines by detecting the peaks in the one-dimensional frequency distribution (step 61). An example of the vertical projection profile of the map in FIG. 3B is shown in FIG. 4B. The multiple peaks in FIG. 4B indicates that there are multiple vertical lines appearing in the map D. The locations of the peaks are detected by comparing the value of every location with a certain threshold. The peaks whose values are larger than the threshold are considered as locations of lines.

A connected component analysis is applied to extract connected components from the map D (see, for example, U.S. Ser. No. 08/739,076). Every connected component represents an object. An object means a character, a graphics, a line, or even noises. When the size of an object is larger than a size threshold or its aspect ratio (height/width) is greater than an aspect threshold value, the object is considered as part of the image. Then the black pixels associated with the object are deleted from the map D (step 62).

Figure 4C:
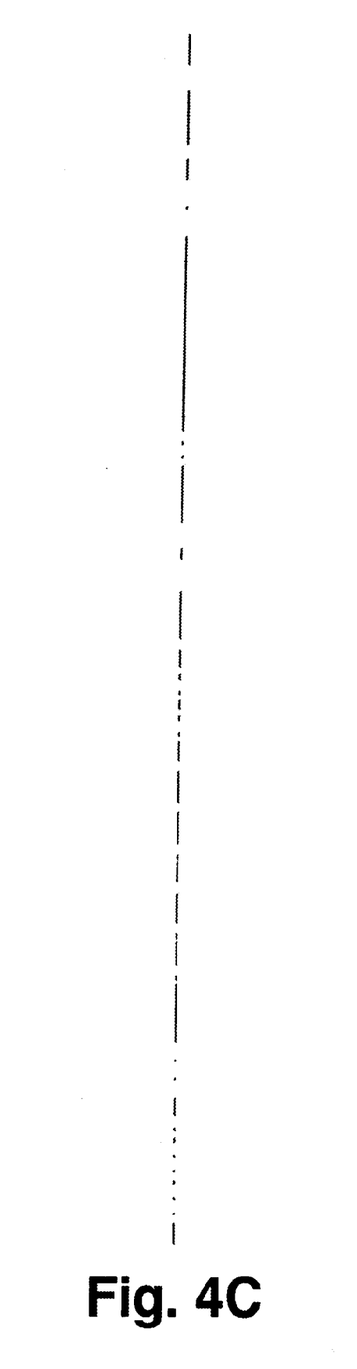
FIG. 4C is an example of a map of the derived vertical lines.

The map of vertical lines is derived from the combination of component analysis and vertical projection profile. The component analysis removes the black pixels of image information from the map D, and the vertical projection profile locates the vertical lines that are considered light vertical lines which are generated by pieces of dirt or dust. After the image processing described above, the map D in FIG. 3B is converted into a vertical line map as shown FIG. 4C.

The Vertical Pattern or Artifact Removal

Figure 5A:
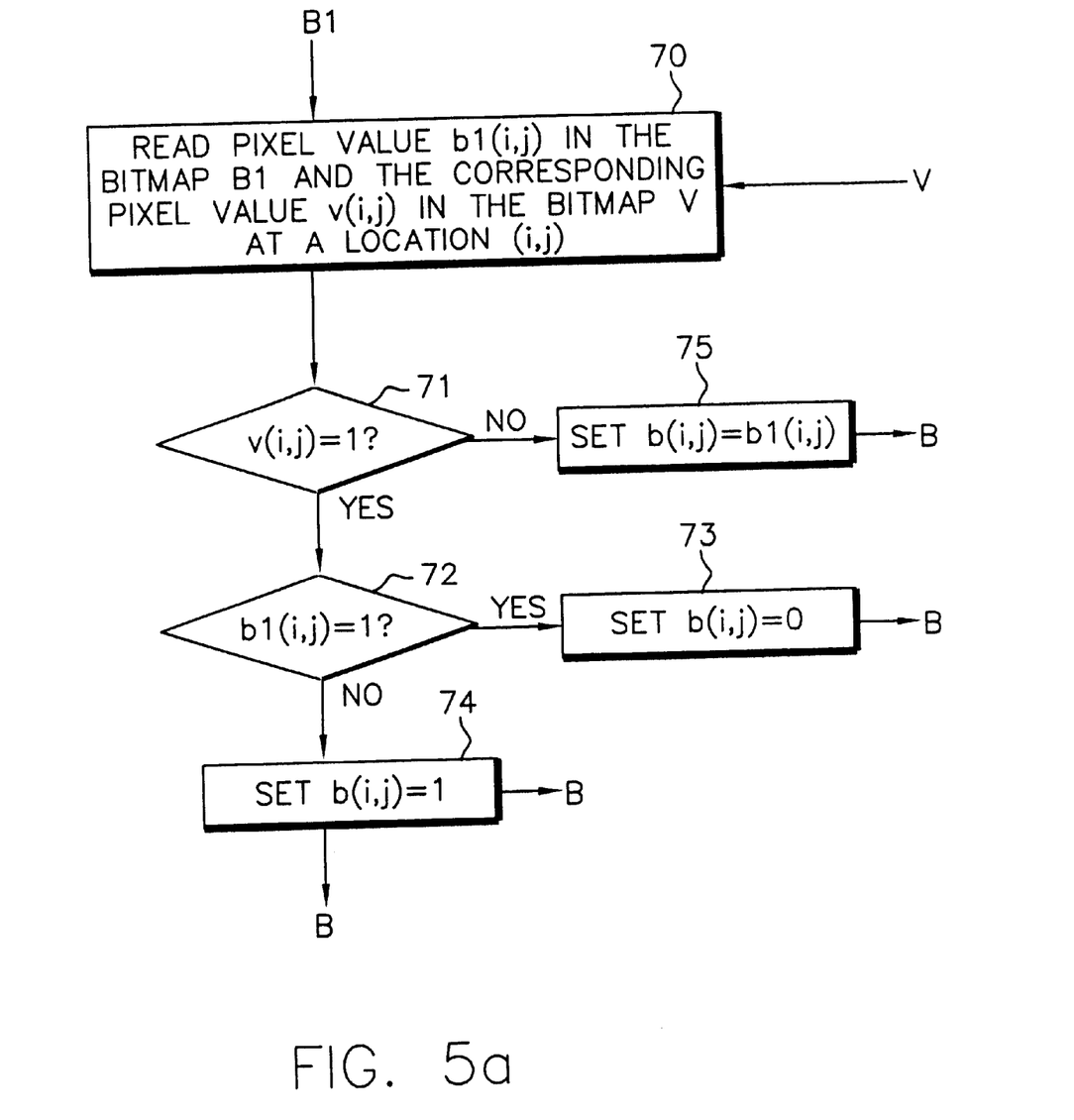
FIG. 5A is a flowchart of removing the vertical black lines in a thresholded image.
Figure 5B:
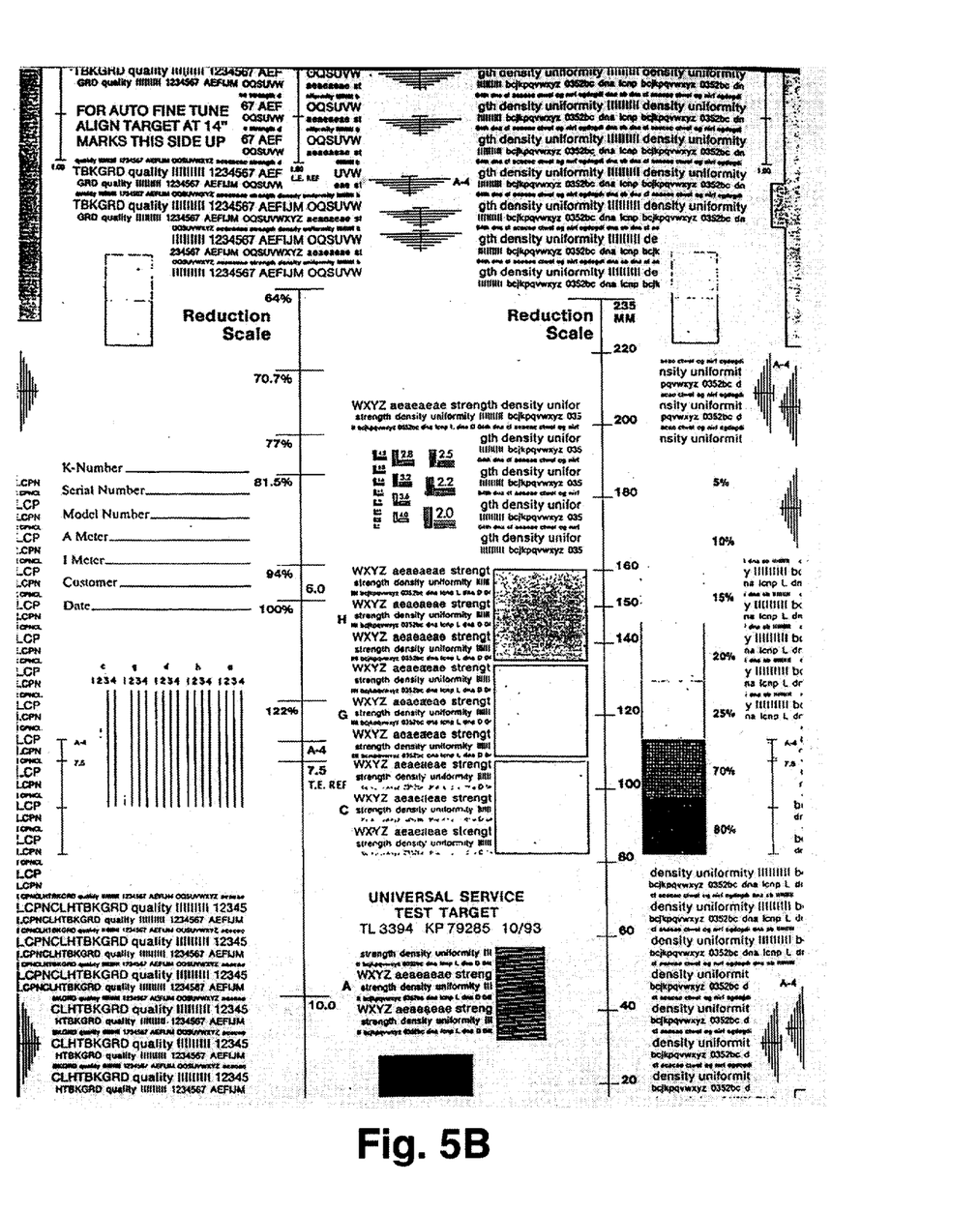
FIG. 5B is an example of a final binary image.

FIG. 5A is a block diagram of the vertical pattern or artifact removal process which will be described with respect to a vertical line removal but is applicable to the removal of dashes, dots, etc. In the process, the bitmap value b1 (i,j) at location (i,j) in the image B1 is read, and the bitmap value v (i,j) at the corresponding location (i,j) in the bitmap V is also read (step 70). If the value v (i,j) is marked as "1", where "1" indicates black and "0" indicates white (step 71), then the value b1 (i,j) is examined (step 72). If the value v (i,j) is marked as "0", then b(i,j) is set equal to b1(i,j) (step 75). If the value b1(i,j) is marked as "1" (black pixel), then the value b1 (i,j) is turned into "0" (white) (step 73). On the other hand, if the value b1(i,j) is marked as "0", then the value b1(i, j) is turned into "1" (black) (step 74). The bitmap B is a copy of bitmap B1 after vertical line removal, where b(i,j) is the value of the bitmap B at location (i,j). The process is applied through every pixel location (i,j) in the images B1 and V, and produces a bitmap B whose vertical lines are removed. FIG. 5B is an example of the final thresholded image in which the vertical line artifacts are removed from the bitmap in FIG. 2E.

The invention has been described in detail with particular reference to certain preferred embodiments thereof, but it will be understood that variations and modifications can be effected within the spirit and scope of the invention.

What is claimed is:

1. An image processing method comprising the steps of:
converting an image into first and second binary images;
comparing said first and second binary images and generating a map indicative of a difference between said first and second binary images;
projecting a vertical profile of said map and detecting peaks in said vertical profile;
locating regions of vertically disposed patterns in said map based on said detected peaks; and
reversing pixels from said first binary image based on said vertically disposed patterns in said map.

2. A method according to claim 1, wherein said converting step comprises the steps of:

applying an edge-based image thresholding to said gray scale image to convert said gray scale image to said first binary image; and applying said edge-based image thresholding to said gray scale image a second time to convert said gray scale image into said second binary image.

3. A method according to claim 1, wherein one of said first and second binary images has a normal contrast parameter, and the other of said first and second binary images has a low contrast parameter.

4. A method according to claim 1, wherein said comparing step comprises the steps of:

comparing said first and second binary images in a pixel by pixel manner; and identifying a pixel as a black pixel if there is a difference between the compared pixels and a white pixel if there is no difference between the compared pixels to generate said map.

5. A method according to claim 1, wherein said vertically disposed pattern is at least one of lines, dots or dashes.

6. A method according to claim 1, wherein said image which is converted into said first and second binary images is a gray scale image.

7. An image processing method comprising the steps of:

capturing an image;

extracting image information from said image and storing a resulting image as a first binary image;

extracting high contrast details from said image and storing a resulting image as a second binary image;

comparing said first and second binary images and generating a bitmap indicative of a difference between said first and second binary images;

projecting a vertical profile of said bitmap;

locating regions of vertically disposed patterns in said bitmap by detecting local peaks in said vertical profile, so as to provide for a map of vertically disposed patterns; and reversing pixels from said first binary image based on said vertically disposed patterns of said map.

8. A method according to claim 7, wherein said vertically disposed pattern is at least one of lines, dots or dashes.

9. An image processing method comprising the steps of:

converting an image into first and second binary images;

generating a map indicative of a difference between said first and second binary images; and reversing pixels from said first binary image based on vertically disposed patterns in said map.

10. An image capture assembly comprising:

an image capture section which captures an image;

a conversion section which converts said captured image into digital image information indicative of said captured image; and a processing section which receives said digital information and converts said captured image into first and second binary images, wherein said processing section compares said first and second binary images to generate a map indicative of a difference between said first and second binary images and reverses pixels from said first binary image based on vertically disposed patterns in said map.

11. An assembly according to claim 10, wherein said vertically disposed pattern is at least one of lines, dots or dashes.

* * * * *